United States Patent
Jeong et al.

(10) Patent No.: US 11,122,274 B2
(45) Date of Patent: *Sep. 14, 2021

(54) VIDEO ENCODING APPARATUS, VIDEO DECODING APPARATUS, AND VIDEO DECODING METHOD FOR PERFORMING INTRA-PREDICTION BASED ON DIRECTIONALITY OF NEIGHBORING BLOCK

(71) Applicant: Ideahub Inc., Seoul (KR)

(72) Inventors: Je Chang Jeong, Daejeon (KR); Soon Jong Jin, Daejeon (KR); Sang Jun Park, Daejeon (KR); Hyuk Lee, Daejeon (KR)

(73) Assignee: Ideahub Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,086

(22) Filed: May 8, 2019

(65) Prior Publication Data

US 2019/0268603 A1    Aug. 29, 2019

Related U.S. Application Data

(63) Continuation of application No. 15/880,402, filed on Jan. 25, 2018, now Pat. No. 10,334,252, which is a
(Continued)

(30) Foreign Application Priority Data

Dec. 30, 2009   (KR) .................. 10-2009-0134017

(51) Int. Cl.
*H04N 19/159*    (2014.01)
*H04N 19/196*    (2014.01)
(Continued)

(52) U.S. Cl.
CPC .......... *H04N 19/159* (2014.11); *H04N 19/11* (2014.11); *H04N 19/124* (2014.11);
(Continued)

(58) Field of Classification Search
CPC .. H04N 19/159; H04N 19/513; H04N 19/547; H04N 19/11; H04N 19/124;
(Continued)

(56) References Cited

U.S. PATENT DOCUMENTS 9,467,705 B2 * 10/2016 Jeong .................. H04N 19/124
9,641,849 B2 *  5/2017 Jeong .................. H04N 19/124
(Continued)

FOREIGN PATENT DOCUMENTS

KR        20090095316 A     9/2009

OTHER PUBLICATIONS

Satoshi Kondo et al., "A Motion Compensation Technique Using Sliced Blocks in Hybrid 2 Video Coding", IEEE International Conference on Image Processing, ICIP, Sep. 14, D 2005, pp. 305-308, Matsushita Electric Industrial Co., Ltd., Osaka, Japan.
(Continued)

*Primary Examiner* — Farzana Hossain
(74) *Attorney, Agent, or Firm* — Capitol IP Law Group, PLLC (57) ABSTRACT

Provided are methods and apparatuses for improving compression efficiency in directional intra-prediction. A video encoding apparatus, which does not need to record intra mode information, includes a mode selector that selects one from among a plurality of intra modes on the basis of a directionality of at least one neighboring block that has already been reconstructed before a current block is reconstructed, an intra predictor that obtains a prediction block of the current block from the at least one neighboring block according to the directionality of the selected mode, and
(Continued)

obtains a residual block by subtracting the prediction block from the current block, and a unit for encoding the obtained residual block.

13 Claims, 11 Drawing Sheets

Related U.S. Application Data continuation of application No. 15/447,055, filed on Mar. 1, 2017, now Pat. No. 9,918,093, which is a continuation of application No. 15/260,240, filed on Sep. 8, 2016, now Pat. No. 9,641,849, which is a continuation of application No. 12/977,928, filed on Dec. 23, 2010, now Pat. No. 9,467,705.

(51) Int. Cl.

| | | |
|---|---|---|
| *H04N 19/176* | (2014.01) | |
| *H04N 19/11* | (2014.01) | |
| *H04N 19/152* | (2014.01) | |
| *H04N 19/513* | (2014.01) | |
| *H04N 19/547* | (2014.01) | |
| *H04N 19/124* | (2014.01) | |
| *H04N 19/61* | (2014.01) | |
| *H04N 19/50* | (2014.01) | |
| *H04N 19/184* | (2014.01) | |

(52) U.S. Cl.
CPC ......... *H04N 19/152* (2014.11); *H04N 19/176* (2014.11); *H04N 19/197* (2014.11); *H04N 19/513* (2014.11); *H04N 19/547* (2014.11); *H04N 19/61* (2014.11); *H04N 19/184* (2014.11); *H04N 19/50* (2014.11)

(58) Field of Classification Search
CPC .. H04N 19/152; H04N 19/176; H04N 19/184; H04N 19/197; H04N 19/50; H04N 19/61
USPC ........................................ 375/240.12, 240.13
See application file for complete search history.

(56) References Cited

U.S. PATENT DOCUMENTS

| | | | | |
|---|---|---|---|---|
| 9,918,093 | B2* | 3/2018 | Jeong ................. | H04N 19/61 |
| 10,334,252 | B2* | 6/2019 | Jeong ................. | H04N 19/11 |
| 2001/0017942 | A1* | 8/2001 | Kalevo ............... | H04N 19/593 382/238 |
| 2004/0062445 | A1* | 4/2004 | Kim .................... | G06T 9/004 382/238 |
| 2007/0133891 | A1* | 6/2007 | Jeong ................. | H04N 19/176 382/238 |
| 2007/0237228 | A1* | 10/2007 | Han .................... | H04N 19/105 375/240.12 |
| 2008/0310503 | A1* | 12/2008 | Lee .................... | H04N 19/61 375/240.2 |
| 2009/0225834 | A1* | 9/2009 | Song .................. | H04N 19/593 375/240.12 |
| 2009/0279606 | A1* | 11/2009 | Lee .................... | H04N 19/573 375/240.12 |
| 2010/0150237 | A1* | 6/2010 | Parhy ................. | H04N 19/176 375/240.13 |
| 2011/0293010 | A1 | 12/2011 | Jeong et al. | |

OTHER PUBLICATIONS

Patent Trial and Appeal Board, Petition for Inter Partes Review of U.S. Pat. No. 9,641,849 Challenging Claims 1 and 4 [Paper 02, IPR2020-00702, Mar. 12, 2020).

Patent Trial and Appeal Board, Patent Owner's Preliminary Response (Paper 06, IPR2020-00702, Jun. 18, 2020).
Patent Trial and Appeal Board, Petitioner's Reply to Patent Owner's Preliminary Response (Paper 07, IPR2020-00702, Jul. 8, 2020).
Patent Trial and Appeal Board, Patent Owner Sur-Reply to Petitioner Reply to Patent Owner Preliminary Response [Paper 08, IPR2020-00702, Jul. 15, 2020).
Patent Trial and Appeal Board, Decision Granting Institution of Inter Partes Review (Paper 09, IPR2020-00702, Sep. 17, 2020).
Patent Trial and Appeal Board, Declaration of Dr. Immanuel Freedman under 37 CFR 1.68 in Support of Petition for nter Partes Review of U.S. Pat. No. 9,641,849 (Exhibit 1003, IPR2020-00702, Mar. 12, 2020).
H.264 and MPEG-1 Video Compression, Iain E. G. Richardson, 2003 (Exhibit 1009, IPR2020-00702, Mar. 12, 2020).
Equation (2001). In The Random House Webster's unbridged dictionary, Random House, Inc. (Exhibit 1011, PR2020-00702, Mar. 12, 2020).
The Authoritative Dictionary of IEEE Standards Terms, 7th Edition, 2000, The Institute of Electrical and Electronics Engineering, Inc (Exhibit 1012, IPR2020-00702, Mar. 12, 2020).
Richard Johnsonbaugh, Discrete Mathematics, 7th Edition, 2009, Pearson Education, Inc (Exhibit 1013, PR2020-00702, Mar. 12, 2020).
Patent Trial and Appeal Board, Second Declaration of Dr. Immanuel Freedman under 37 CFR 1.68 in Support of Petitioner's Reply and Petitioner's Opposition to Motion to Amend (Exhibit 1021, IPR2020-00702, Mar. 11, 2021).
Explicit (1998). In The Random House Webster's unbridged dictionary, Random House, Inc. (Exhibit 1027, PR2020-00702, Mar. 11, 2021).
Explicit (2000). In The Merriam-Webster's Collegiate Dictionary, Tenth Edition, Merriam-Webster, Incorporated (Exhibit 1029, IPR2020-00702, Mar. 11, 2021).
Patent Trial and Appeal Board, Second Declaration of Kevin Jakel (Exhibit 1030, IPR2020-00702, Mar. 11, 2021).
Brute force (2016). In The Dictionary of Computer Science, Seventh Edition, Oxford University Press (Exhibit 1031, PR2020-00702, Mar. 11, 2021).
Kalva et al., "Exploiting the Directional Features in MPEG-2 for H.264 Intra Transcoding," IEEE Transactions on Consumer Electronics, vol. 52, No. 2, May 2006 (Exhibit 1032, IPR2020-00702, Mar. 11, 2021).
Harris et al., "Handbook of Mathematics and Computational Science," pp1-9, Springer, 1998 (Exhibit 1033, PR2020-00702, Mar. 11, 2021).
Patent Trial and Appeal Board, Declaration of Dr. Clifford Reader (Exhibit 2001, IPR2020-00702, Apr. 22, 2021).
Patent Trial and Appeal Board, Transcript of Deposition of Immanuel Freedman, Ph. D (Exhibit 2016, IPR2020-00702, Apr. 22, 2021).
Patent Trial and Appeal Board, Second Declaration of Dr. Clifford Reader (Exhibit 2017, IPR2020-00702, Apr. 22, 2021).
Patent Trial and Appeal Board, Verified Translation of KR10-2009-0134017 (Exhibit 2018, IPR2020-00702, Apr. 22, 2021).
Patent Trial and Appeal Board, Petitioner's Opposition To Patent Owner'S Contingent Motion To Amend (Paper 24, IPR2020-00702, Mar. 11, 2021).
Patent Trial and Appeal Board, Patent Owner's Revised Contingent Motion To Amend Under 37 C.F. R. § 42.121 (Paper 31, IPR2020-00702, Apr. 22, 2021).
Patent Trial and Appeal Board, Petitioner's Opposition To Patent Owner's Revised Contingent Motion To Amend (Paper 37, IPR2020-00702, Jun. 3, 2021).
Patent Trial and Appeal Board, Patent Owner's Contingent Motion To Amend Under 37 C.F.R. § 42.121 Paper 18, IPR2020-00702, Dec. 10, 2020).

\* cited by examiner

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

FIG. 7A 0 (vertical)

Current Block

FIG. 7B 1 (horizontal)

Current Block

FIG. 7 C

3 (diagonal down-left)

FIG. 7 D

4 (diagonal down-right)

FIG. 7 E 5 (vertical right)

FIG. 7 F 6 (horizontal down)

FIG. 7G 7 (vertical left)

FIG. 7H 8 (horizontal up)

VIDEO ENCODING APPARATUS, VIDEO DECODING APPARATUS, AND VIDEO DECODING METHOD FOR PERFORMING INTRA-PREDICTION BASED ON DIRECTIONALITY OF NEIGHBORING BLOCK

CROSS-REFERENCE TO RELATED APPLICATION

This application is a continuation of and claims priority to U.S. application Ser. No. 15/880,402 filed Jan. 25, 2018, which is a continuation of U.S. application Ser. No. 15/447,055 filed Mar. 1, 2017 (now U.S. Pat. No. 9,918,093), which is a continuation of and claims priority to U.S. application Ser. No. 15/260,240, filed Sep. 8, 2016 (now U.S. Pat. No. 9,641,849), which is a continuation of and claims priority to U.S. application Ser. No. 12/977,928, filed Dec. 23, 2010 (now U.S. Pat. No. 9,467,705), which claims priority to and the benefit of Korean Patent Application No. 10-2009-0134017, filed Dec. 30, 2009, the disclosures of which are incorporated herein by reference in their entirety.

BACKGROUND

1. Technical Field

Example embodiments of the present invention relates to a video compression method and, more particularly, to a method and apparatus for improving compression efficiency in directional intra-prediction.

2. Related Art

With the development of telecommunication technologies including the Internet, video communication is increasing in addition to text communication and voice communication. It is insufficient to satisfy various desires of consumers with existing text-based communication. Thus, multimedia service capable of covering various types of information such as text, image, music, etc. is increasing. Multimedia data requires a high-capacity storage medium due to its enormous volume, and a wide bandwidth when transmitted. Thus, to transmit the multimedia data including text, video, and audio, it is essential to use a compression coding technique.

A fundamental principle of compressing data is based on a process of eliminating the redundancy from data. The data can be compressed by eliminating spatial redundancy referring to repetition of the same color or object in an image, temporal redundancy referring to little or nothing of variation between neighboring frames in a moving picture frame or successive repetition of same sound in the audio, or psycho-visual redundancy referring to dullness of human vision and sensation to high frequencies.

As a method of compressing this moving picture, a growing interest in H.264 or advanced video coding (AVC) that further improves compression efficiency compared to Moving Picture Experts Group-4 (MPEG-4) has recently been taken. As a scheme for improving the compression efficiency, H.264 employs directional intra-prediction (hereinafter, shortened simply to "intra-prediction") to eliminate spatial redundancy within a frame.

Figure 1:
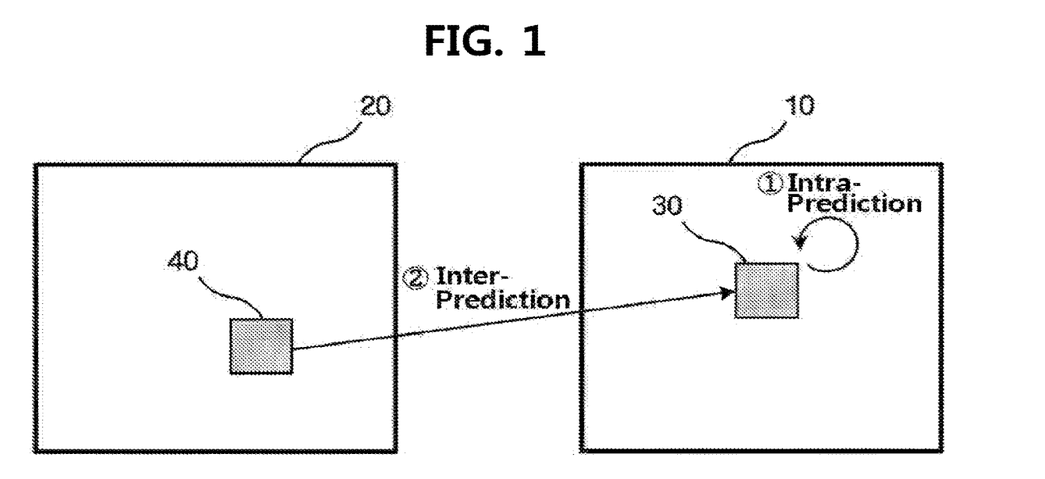
FIG. 1 shows comparison of intra-prediction with inter-prediction.

The intra-prediction refers to a method of coping one sub-block in a designated direction using neighboring pixels in upward and leftward directions, predicting values of current sub-blocks, and encoding only the differences between the copied values and the predicted value of the sub-blocks. By contrast, inter-prediction or temporal prediction refers to a method of performing prediction with reference to the area 40 of a frame 20 having a difference of time, as shown in FIG. 1. This intra-prediction is complementary to the inter-prediction. In other words, one of the two prediction methods that is favorable for the image to be encoded is selectively used.

In the intra-prediction technique complying with the existing H.264 standard, a prediction block is generated from a current block on the basis of another block having a previous encoding sequence. A value subtracting the prediction block from the current block is encoded. In terms of a luminance component, the prediction block is generated in units of 4×4 blocks or 16×16 macroblocks. Nine prediction modes can be selected for each 4×4 block, whereas four prediction modes can be selected for each 16×16 macroblock. A video encoder based on H.264 selects one from among the prediction modes with respect to each block. In the selected prediction mode, a difference between the current block and the prediction block is minimized.

Figure 2:
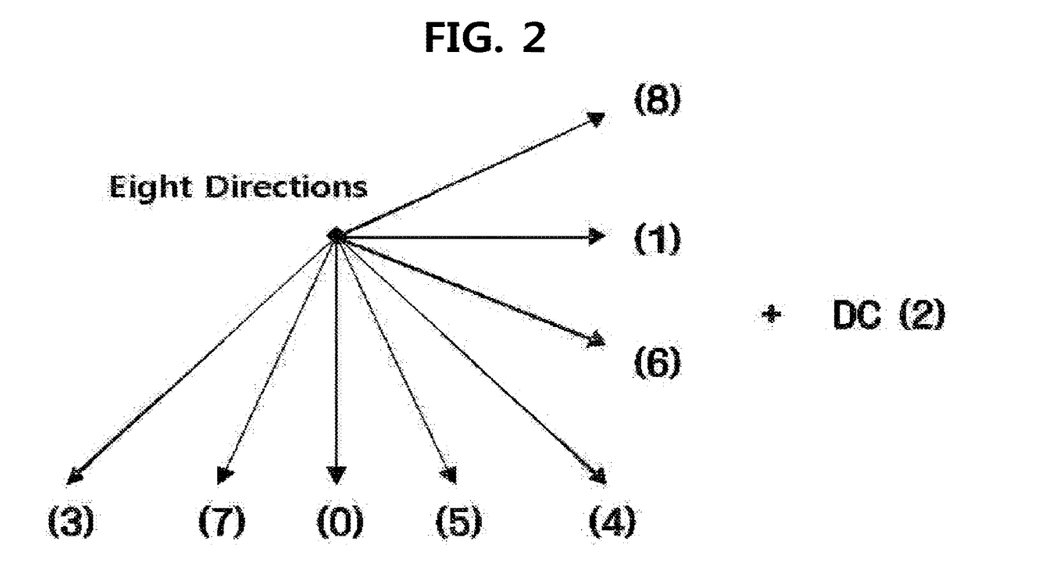
FIG. 2 shows directionality of a conventional intra-prediction mode.

As the prediction mode for the 4×4 block, nine prediction modes including a total of eight modes (modes 0, 1, and 3 through 8) having directionality and a direct current (DC) mode (mode 2) using a mean value of eight neighboring pixels are used in H.264, as shown in FIG. 2.

Figure 3:
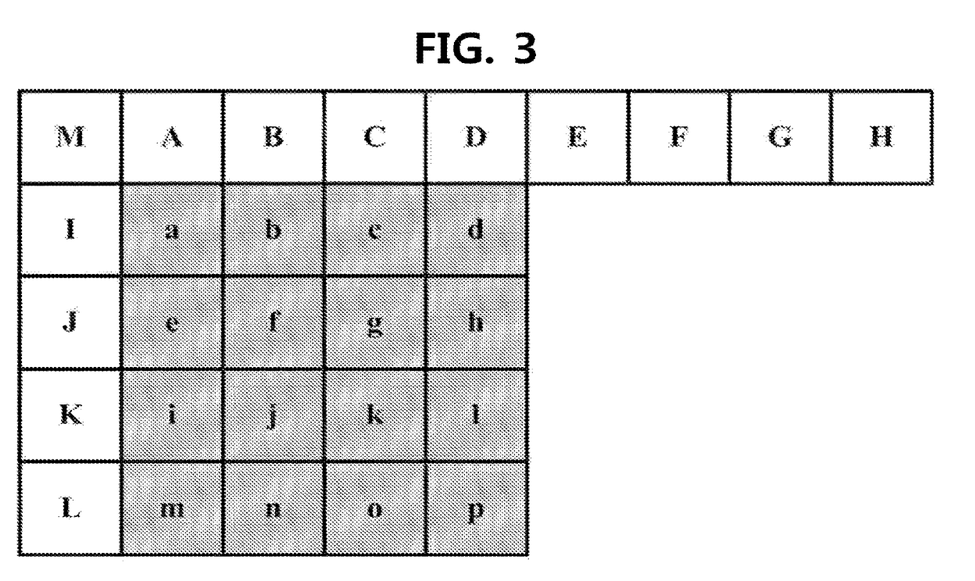
FIG. 3 shows an example of labeling for explaining the intra-prediction mode of FIG. 2.

FIG. 3 shows an example of labeling for explaining the nine prediction models. In this case, a prediction block (areas including a through p) is generated from the current block using samples A through M that are previously decoded. Here, if E, F, G and H cannot be previously decoded, D is copied at their positions, so that E, F, G and H can be virtually generated.

The nine prediction modes will be described in detail with reference to FIG. 4. In the case of mode 0, pixels of the prediction block are estimated by extrapolation in a vertical direction using upper samples A, B, C and D. In the case of mode 1, the pixels of the prediction block are estimated by extrapolation in a horizontal direction using left samples I, J, K and L. Further, in the case of mode 2, the pixels of the prediction block are identically contrapositioned on the average of the upper samples A, B, C and D and the left samples I, J, K and L.

Further, in the case of mode 3, the pixels of the prediction block are estimated by interpolation at an angle of 45° in an upper-right to lower-left (diagonal down-left) direction. In the case of mode 4, the pixels of the prediction block are estimated by extrapolation at an angle of 45° in an upper-left to lower-right (diagonal down-right) direction. Further, in the case of mode 5, the pixels of the prediction block are estimated by extrapolation at an angle of about 26.6° (width/height=½) in a vertical-right direction.

In addition, in the case of mode 6, the pixels of the prediction block are estimated by extrapolation at an angle of about 26.6° in a horizontal-down direction. In the case of mode 7, the pixels of the prediction block are estimated by extrapolation at an angle of about 26.6° in a vertical-left direction. Finally, in the case of mode 8, the pixels of the prediction block are estimated by interpolation at an angle of about 26.6° in a horizontal-up direction.

Figure 4:
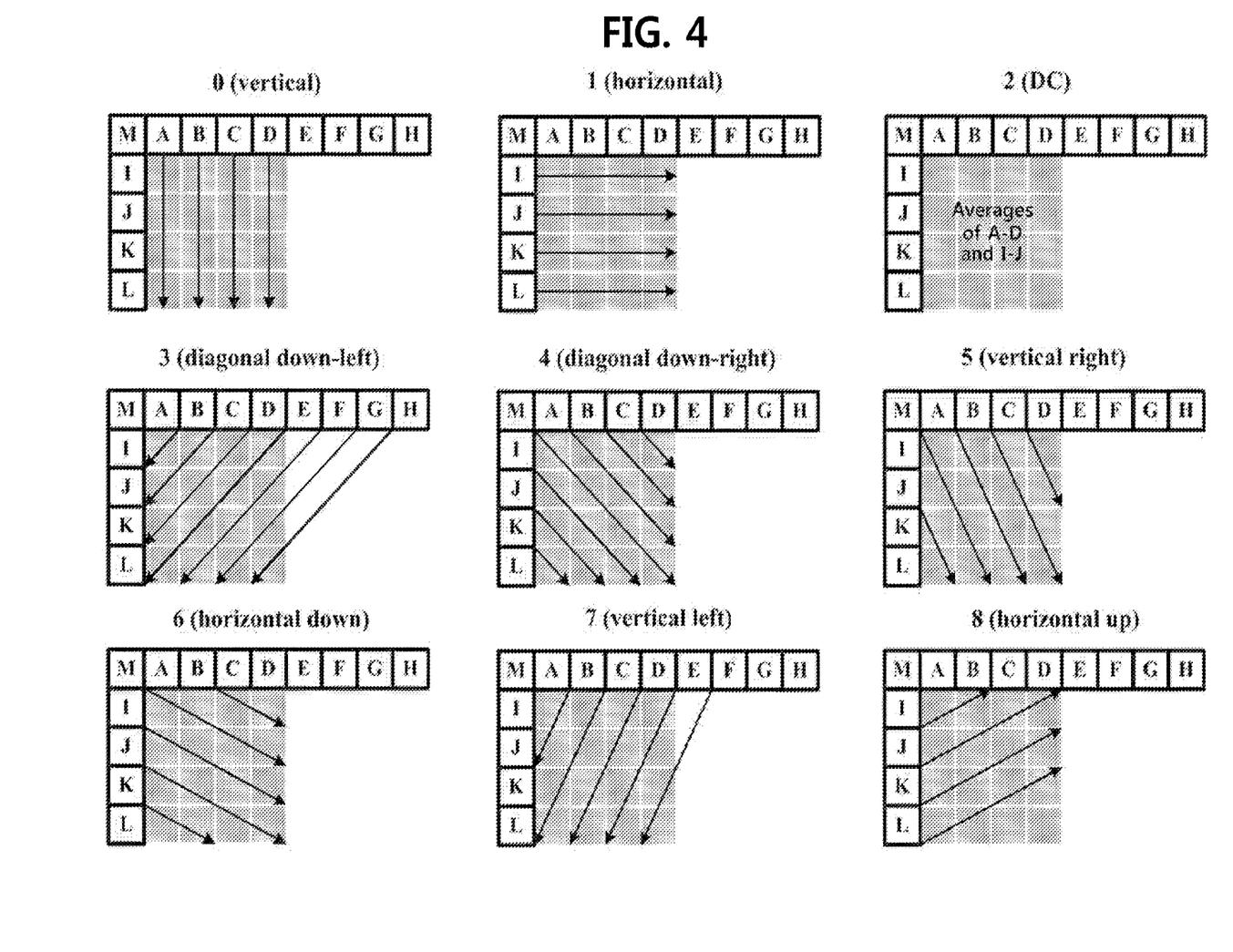
FIG. 4 shows details of the intra-prediction mode of FIG. 2.

Arrows of FIG. 4 indicate prediction directions in each mode. The samples of the prediction block in modes 3 through 8 can be generated from a weighted average of previously-decoded reference samples A through M. For example, in the case of mode 4, the sample d located at the upper right edge of the prediction block can be estimated as in Equation 1 below. Here, round( ) is the integer round-off function.

$$d = \text{round}(B/4 + C/2 + D/4) \qquad \text{[Equation 1]}$$

Meanwhile, there are four modes 0, 1, 2, and 3 in the 16×16 prediction model for a luminance component. In the case of mode 0, the pixels of the prediction block are estimated from upper samples by extrapolation. In the case of mode 1, the pixels of the prediction block are estimated from left samples by extrapolation. Further, in the case of mode 2, the pixels of the prediction block are calculated by averaging the upper samples and left samples. Finally, in the case of mode 3, the pixels of the prediction block use a linear "plane" function that is fitted to the upper and left samples. This mode works well in areas of smoothly-varying luminance.

In this manner, the video encoder based on the H.264 standard performs intra-prediction using a total of nine modes including eight modes having directionality (hereinafter, referred to as "directional modes") and one DC mode. Intra mode information representing one of the nine modes obtained in this way is transmitted to a video decoder. The video decoder obtains a prediction block from a current block in the same method as the video encoder on the basis of the intra mode information, and reconstructs the current block from the obtained prediction block.

SUMMARY

However, since this intra mode information is given to each 4×4 block, it may act as an overhead increasing the size of a coded bitstream. This means that the intra mode information is required per 16 pixels, and thus is by no means a small amount compared to a result of encoding a residual.

Example embodiments of the present invention is directed to provide a video encoding method and apparatus, and a video decoding method and apparatus, for enhancing efficiency of intra-prediction in video coding.

It is to be understood that technical problems to be solved by the present invention are not limited to the aforementioned technical problems, and other technical problems which are not mentioned will be apparent from the following description to persons with ordinary skill in the art to which the present invention pertains.

In some example embodiments, there is provided a video encoding apparatus, which does not need to record intra mode information. The video encoding apparatus includes: a mode selector configured to select one from among a plurality of intra modes on the basis of directionality of at least one neighboring block, the at least one neighboring block having already been reconstructed before the current block is reconstructed; an intra predictor configured to obtain a prediction block of the current block from the at least one neighboring block according to the directionality corresponding to the selected mode, and configured to obtain a residual block by subtracting the prediction block from the current block; and means for encoding the obtained residual block.

In other example embodiments, there is provided a video decoding apparatus, which does not need to receive intra mode information. The video decoding apparatus includes means for reconstructing a residual signal of a current block from an input bitstream; a mode selector configured to select one from among a plurality of intra modes on the basis of directionality of at least one neighboring block, the at least one neighboring block having already been reconstructed before the current block is reconstructed; and an intra reconstructor configured to obtain a prediction block of the current block from the at least one neighboring block according to a directionality of the selected mode, and configured to reconstruct the current block by adding the residual signal of the current block and the prediction block.

In still other example embodiments, there is provided a video decoding method, which includes reconstructing a residual signal of a current block from an input bitstream; selecting one from among a plurality of intra modes; and performing an intra-prediction according to a directionality of the selected intra mode to reconstruct the current block. The plurality of intra modes may use 34 modes for an 8×8 block. The 34 modes may have a maximum of 34 directions, each of which may be an arbitrary direction with respect to on the basis of an arbitrary pixel within the current block, the arbitrary direction may have a slope defined as dy in a vertical direction over dx in a horizontal direction, wherein dx and dy may be natural numbers. The number of the plurality of intra modes may be different depending on a block size. The plurality of intra modes may include at least one of 9 intra modes for a 4×4 block, 9 intra modes for an 8×8 block, 34 intra modes for a 16×16 block, 34 intra modes for a 32×32 block, 5 intra modes for a 64×64 block, and 5 intra modes for a 128×128 block. The selecting of one from among a plurality of intra modes may include selecting one from among the plurality of intra modes on the basis of a directionality of at least one neighboring block that has already been reconstructed before the current block is reconstructed. The performing an intra-prediction according to a directionality of the selected intra mode to reconstruct the current block may includes: obtaining a prediction block of the current block from the at least one neighboring block according to the directionality of the selected mode; and reconstructing the current block by adding the residual signal of the current block and the prediction block. The at least one neighboring block may include at least one of a upper block, a left block, a upper left block, and a upper right block with respect to the current block.

BRIEF DESCRIPTION OF THE DRAWINGS

The above and other objects, features and advantages of example embodiments of the present invention will become more apparent to those of ordinary skill in the art by describing in detail example embodiments thereof with reference to the attached drawings, in which.

DETAILED DESCRIPTION OF EXAMPLE EMBODIMENTS

Hereinafter, example embodiments of the present invention will be described in detail. The above and other objects, features and advantages of example embodiments of the present invention will become more apparent to those of ordinary skill in the art by describing in detail example embodiments thereof with reference to the attached drawings. However, example embodiments of the present invention is not limited to the embodiments disclosed below, but can be implemented in various forms. These embodiments are rather provided so that this disclosure will be through and complete, and will fully convey the scope of the invention to those skilled in the art. The scope of the invention is merely defined by the appended claims and its equivalents. In the following detailed description, the same reference numeral will be used for the same component or components regardless of the figures in order to facilitate understanding of example embodiments of the invention.

There are two types of data, which are to be encoded after intra-prediction. One of them is texture data of a residual block generated by a difference between a block predicted from neighboring blocks and a current block, and the other is intra mode information applied to each block. An intra-prediction method proposed by example embodiments of the present invention is intended to provide technology for performing the intra-prediction without the intra mode information. In example embodiments of the present invention, the term "block" will be used as concept covering a macroblock or a sub-block (8×8 block or 4×4 block) having a smaller size than the macroblock.

Figure 5:
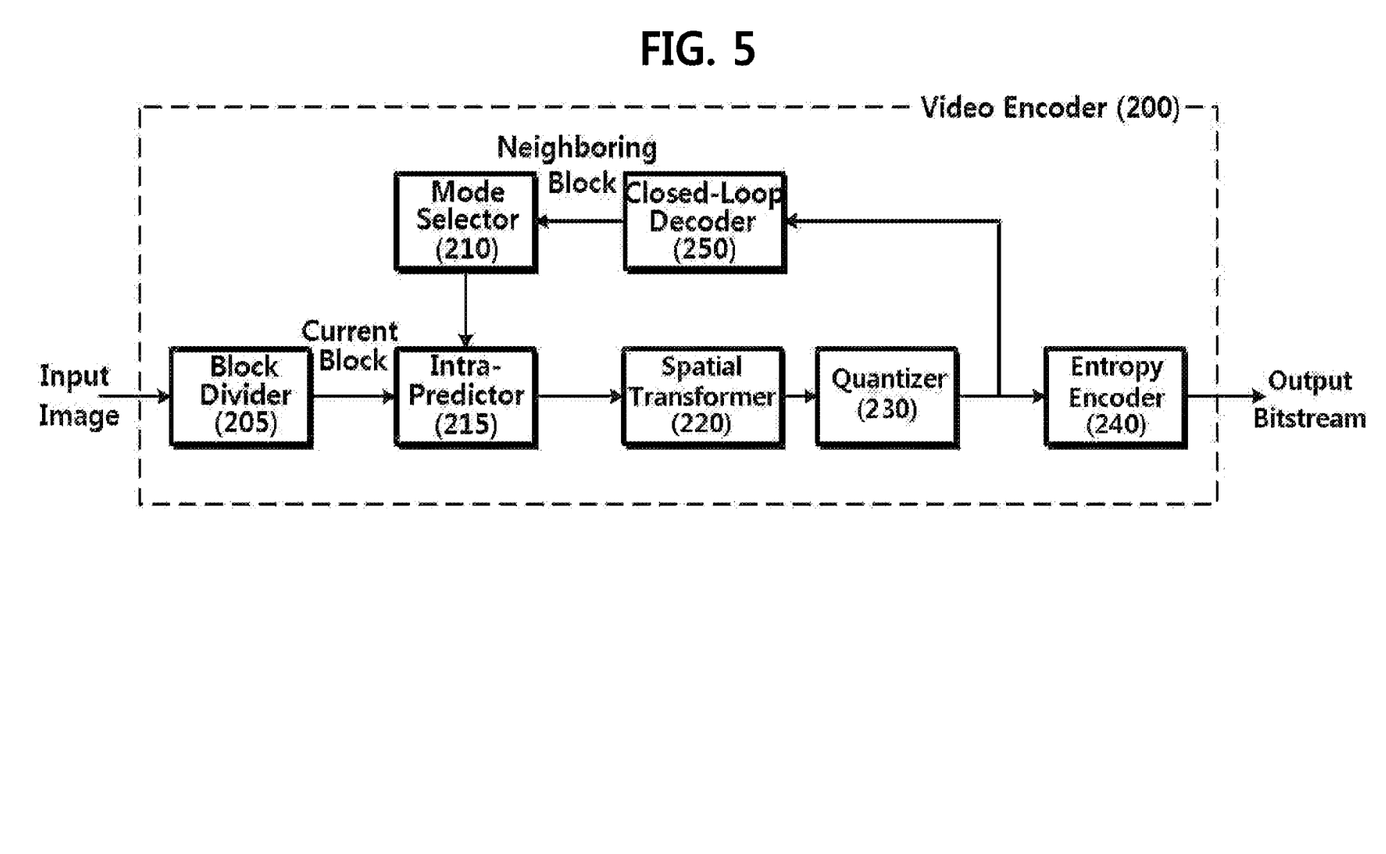
FIG. 5 is a block diagram showing the construction of a video encoder according to an example embodiment of the present invention.

FIG. 5 is a block diagram showing the construction of a video encoder 200 according to an example embodiment of the present invention.

The video encoder 200 may include a block divider 205, a mode selector 210, an intra-predictor 215, a spatial transformer 220, a quantizer 230, an entropy encoder 240, and a closed-loop decoder 250.

The block divider 205 divides an input image into blocks of a predetermined size. The size of each block may be 4×4, 8×8, or 16×16 according to whether the input image is a chrominance signal or a luminance signal, or according to a different condition. In example embodiments of the present invention, the description will be made on the assumption that a current block to be encoded is a block having a 4×4 size and has a total of nine intra modes (mode 0 through mode 8). Further, the divided blocks may be formed by symmetrical partition in a square shape of 4×4, 8×8, or 16×16, or by asymmetrical partition in various geometrical shapes such as a rectangular shape of 4×16, 12×16, 24×32, 8×32, 16×64, or 48×64, an "L" shape, a triangular shape, and so on.

The mode selector 210 according to an example embodiment of the present invention selects a mode suitable for the current block from among a plurality of intra modes using "directionality" of neighboring blocks of the current block. The neighboring blocks have already been reconstructed before the current block is reconstructed. This method of selecting the mode is different from a method of calculating a cost of each mode for the current block on the basis of a rate-distortion cost as in the conventional H.264 and then selecting the mode that minimizes this cost.

In detail, since the video decoder cannot directly use information about the current block to be reconstructed unlike the video encoder, information that can be used in common between the video encoder and the vide decoder should be used. This is because, unlike the conventional H.264, the intra mode information is not encoded in an example embodiment of the present invention. That is, in an example embodiment of the present invention, unlike the conventional H.264, the encoder does not transmit the intra mode information, and the decoder can obtain an optimal intra mode, in which a cost function is minimized on the basis of the directionality of the neighboring blocks that have already been reconstructed before the current block is reconstructed, for the current block, and thereby perform the intra-prediction. Alternatively, in another example embodiment of the present invention, the encoder may obtain an optimal intra mode, in which a cost function is minimized on the basis of the directionality of the neighboring blocks that have already been reconstructed, for the current block, and then may transmit the obtained intra mode information to the decoder.

In detail, an example embodiment of the present invention employs a method of selecting the intra mode of the current block on the basis of the directionality of at least one of the neighboring blocks that have already been reconstructed. Here, the directionality of the neighboring block(s) may refer to, for instance, an optimal direction, which is estimated from the neighboring blocks, among the nine directions as in H.264 (rather than a method of directly calculating the cost of the current block unlike H.264). That is, the intra-prediction according to an example embodiment of the present invention selects the intra mode of the current block on the basis of the directionality of the neighboring blocks that have already been reconstructed. By contrast, the existing H.264 is different from example embodiments of the present invention in that it employs a method of performing the intra-prediction on the current block using the nine intra modes and selecting the intra mode having a minimum cost, rather than the method of selecting the intra mode of the current block on the basis of the directionality of the neighboring blocks that have already been reconstructed as in example embodiments of the present invention.

The image associated with the neighboring blocks is information that can be used in common in the video encoder as well as the video decoder. However, to be completely matched with the video decoder, the neighboring blocks are preferably obtained from an image reconstructed by closed-loop decoding, i.e. encoding and decoding, rather than obtained from the original input image.

The closed-loop decoder 250 serves to provide this image, which is reconstructed for the neighboring blocks, to the mode selector 210. The closed-loop decoder 250 obtains an image reconstructed by performing dequantization and inverse spatial transform on the result quantized by the quantizer 230 again, and then inversely performing original coding (inter coding, intra coding, or the like) on the result obtained by the inverse spatial transform. Note that, because the current block is predicted by the intra-coding, its neighboring blocks are all subjected to the intra coding, and then the image does not need to be reconstructed. Thus, it does not matter that the neighboring blocks are obtained from the image, which is reconstructed after being encoded by inter coding, intra coding, or other coding.

It has been described that the mode selector 210 selects the mode suitable for the current block using the directionality of the neighboring blocks. This description will be made below in greater detail with reference to FIG. 7.

The intra-predictor 215 obtains a prediction block of the current block according to the intra mode selected by the mode selector 210, and subtracts the obtained prediction block from the current block, thereby obtaining a residual block (residual signal). Once the intra mode (e.g. one of the nine modes of FIG. 4) is determined by the mode selector 210, the prediction block can be obtained according to the determined intra mode using the same method as in the conventional H.264 of FIG. 4 (in the case of the luminance signal, the nine intra modes are used for the 4×4 block, and the four intra modes are used for the 16×16 block; in the case of the chrominance signal, the four intra modes are used for the 8×8 block). Example embodiment of the present invention is not limited to this method. Thus, the prediction block may be obtained by another codec than H.264.

Here, as an example of the other codec than H.264, in the case of the 8×8 block, the intra-prediction may be performed using 34 modes. Here, the 34 modes may represent a maximum of 34 directions, each of which is an arbitrary direction with respect to an arbitrary pixel within the current block. The arbitrary direction has a slope defined as dy in a vertical direction over dx in a horizontal direction (where dx and dy are natural numbers).

As another example of the other codec than H.264, a different number of intra modes may be used according to a block size. For example, 9 intra modes may be used for a 4×4 block, 9 intra modes may be used for an 8×8 block, 34 intra modes may be used for a 16×16 block, 34 intra modes may be used for a 32×32 block, 5 intra modes may be used for a 64×64 block, and 5 intra modes may be used for a 128×128 block.

The residual block obtained by the intra predictor 215 is provided to the spatial transformer 220 in order to perform spatial transform such as discrete cosine transform (DCT).

Although not shown in FIG. 5, the video encoder 200 may further include an inter predictor. The inter predictor performs inter-prediction on the blocks divided by the block divider 205. That is, the inter predictor can estimate motion for the divided blocks in units of blocks and generate motion vectors. Here, the divided blocks used for the motion estimation may vary in size. The divided blocks may be formed by symmetrical partition in a square shape of 4×4, 8×8, or 16×16, or by asymmetrical partition in various geometrical shapes such as a rectangular shape of 4×16, 12×16, 24×32, 8×32, 16×64, or 48×64, an "L" shape, a triangular shape, and so on. The inter predictor may perform motion compensation using the generated motion vector and a reference picture, and generate a prediction block.

Although not shown in FIG. 5, the video encoder 200 may further include a subtractor, which subtracts the prediction block provided by the inter predictor from the current block and generates a residual value. The inter-prediction and the intra-prediction may be selectively used for each block.

The spatial transformer 220 removes spatial redundancy from the residual block provided by the intra predictor 215 using spatial transform. As this spatial transform, discrete cosine transform (DCT) or wavelet transform may be used. A coefficient obtained by the spatial transform is referred to as a transform coefficient. Particularly, when the DCT is used as the spatial transform, the transform coefficient is referred to as a DCT coefficient.

The quantizer 230 quantizes the transform coefficient obtained by the spatial transformer 220. The quantizing process refers to a process of dividing the transform coefficient expressed by an arbitrary real number value by a constant section, representing the divided transform coefficient by a discrete value, and matching it with a predetermined index. Particularly, when the wavelet transform is used as the spatial transform, embedded quantization may be used as the quantization.

The entropy encoder 240 losslessly encodes the transform coefficient quantized by the quantizer 230, the difference value which is the residual value, between the prediction block provided by the inter predictor and the current block, or the direction difference provided by the intra predictor 215, and generates a bitstream. As the lossless coding, arithmetic coding, variable length coding, Huffman coding, etc. may be used.

Figure 6:
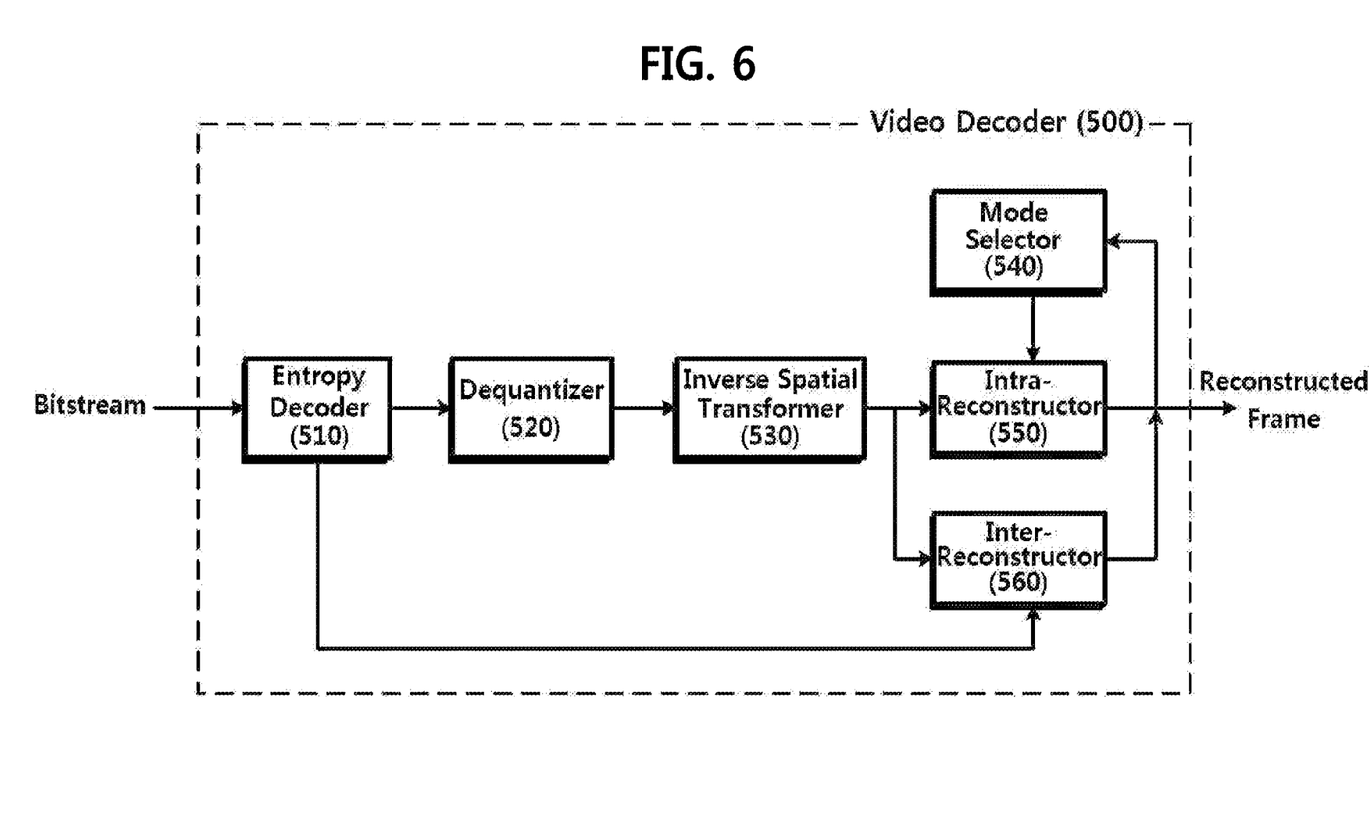
FIG. 6 is a block diagram showing the construction of a video decoder according to an example embodiment of the present invention.

FIG. 6 is a block diagram showing the construction of a video decoder 500 according to an example embodiment of the present invention.

The video decoder 500 may include an entropy decoder 510, a dequantizer 520, an inverse spatial transformer 530, a mode selector 540, an intra reconstructor 550, and an inter reconstructor 560.

The entropy decoder 510 performs lossless decoding that is reverse to entropy encoding, and extracts motion data (data relevant to motion vector and reference frame information) in the inter-prediction. The extracted texture data is provided as a quantization coefficient to the dequantizer 520, and the motion data is provided to the inter reconstructor 560.

The dequantizer 520 dequantizes the quantization coefficient transmitted from the entropy decoder 510. The dequantizing process refers to a process of searching for the transform coefficient matched with the value expressed and transmitted by the predetermined index at the stage of the video encoder 200. A table representing a matching relation between the indices and the transform coefficients may be transmitted from the stage of the video encoder 200, and be previously set by arrangement between the encoder and the decoder.

The inverse spatial transformer 530 inversely performs spatial transform, and transforms a transform coefficient (frequency domain) provided by the dequantization into a residual signal in a spatial domain. For example, when the spatial transform is performed on the basis of the wavelet transform at the stage of the video encoder, the inverse spatial transformer 530 will perform inverse wavelet transform. When the spatial transform is performed on the basis of the DCT at the stage of the video encoder, the inverse spatial transformer 530 will perform inverse DCT.

The mode selector 540 selects a mode suitable for the current block from among the nine intra modes using the directionality of the neighboring blocks of the current block which have already been reconstructed. Of course, the neighboring blocks may be blocks that are reconstructed by the intra reconstructor 550 or that are to be reconstructed by the inter reconstructor 560. In this manner, the method of determining the intra mode at the mode selector 550 is identical to that of selecting the intra mode at the mode selector 210 of the video encoder 200. Thus, according to an example embodiment of the present invention, the video decoder 500 need not receive information about the intra mode from the video encoder 200. It has been described that the mode selector 540 selects the mode suitable for the current block using the directionality of the neighboring blocks. This description will be made below in greater detail with reference to FIG. 7.

The intra reconstructor 550 obtains a prediction block of the current block according to the intra mode selected by the mode selector 540, adds the prediction block and the residual signal of the current block provided from the inverse spatial transformer 530, and reconstructs the current block. Once the intra mode is determined by the mode selector 540, the prediction block can be obtained according to the determined intra mode (e.g., using the same method as in the conventional H.264 of FIG. 4 or another codec than H.264 described above).

Meanwhile, to reconstruct the current block from the inter-prediction, the inter reconstructor 560 is used. This is because, although the current block will be reconstructed by the intra-prediction, it does not matter by which method its neighboring blocks are decoded.

The inter reconstructor 560 performs motion compensation on the previously reconstructed frame using the motion data provided from the entropy decoder 510, and generates a motion-compensated frame. Of course, this motion compensating process is applied only when the current block to be reconstructed is encoded through the inter-prediction process at the stage of the video encoder. Further, when the residual block reconstructed by the inverse spatial transformer 530 is generated by the inter-prediction, the inter reconstructor 560 adds the residual block and a domain corresponding to it within the motion-compensated frame, and thereby reconstructs the current block.

As described above, when the blocks reconstructed by the intra reconstructor 550 and the inter reconstructor 560 are assembled, the reconstructed frame can be finally completed.

Up to now, each component of FIGS. 5 and 6 may refer to software or hardware such as a field-programmable gate array (FPGA) or an application-specific integrated circuit (ASIC). However, these components are not limited to the software or hardware, and thus may be constructed so as to be present in an addressable storage medium or to enable one or more processors. Functions provided within the components can be implemented by subdivided components or one component that combines a plurality of components to perform a specific function.

FIGS. 7A through 7H show a detailed method of a mode selector 210 or 540 selecting a mode suitable for a current block from among a plurality of intra modes using directionality of neighboring blocks of the current block which have already been reconstructed in accordance with an example embodiment of the present invention. The neighboring blocks may include blocks that have already been reconstructed. For example, the neighboring blocks may include an upper block, a left block, an upper left block, and an upper right block, all of which have already been reconstructed with respect to the current block by the same method as H.264.

First, the mode selector 210 or 540 calculates a cost $C_i$ with respect to a specific directionality i by means of a sum (or an average) of deviations according to the directionalities using Equation 2 below.

$$C_i = \sum_{k=0}^{n-1} D_{ik}$$ [Equation 2]

In Equation 2, n is the number of pixel pairs k for calculating the deviation, i is the intra mode number, and $D_{ik}$ is the deviation between the pixel pairs k corresponding to the specific directionality i. The symbol n may be selected by another number depending on an embodiment. In example embodiments of the present invention, the description will be made on the assumption that n is set to 12.

Figure 7:
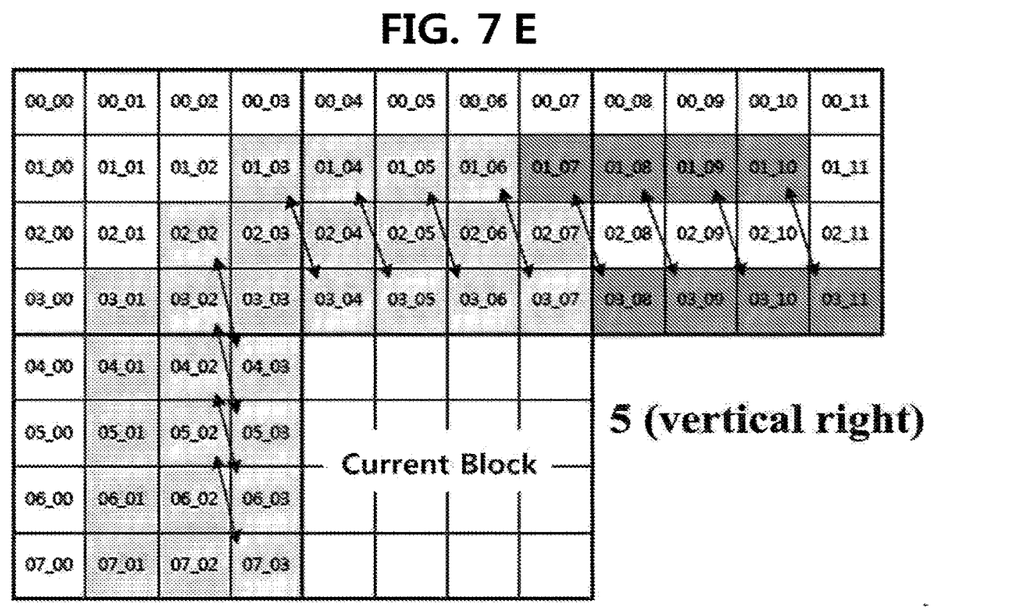
FIGS. 7A through 7H show a first detailed example embodiment of generating a prediction block of intra-prediction of the present invention.
Figure 7A:
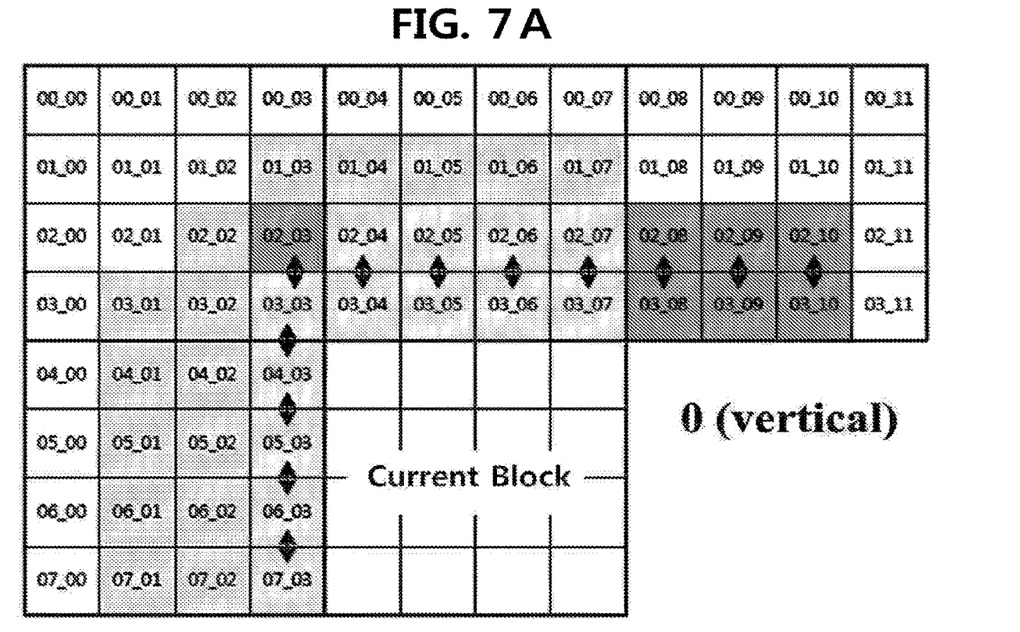
Figure 7B:
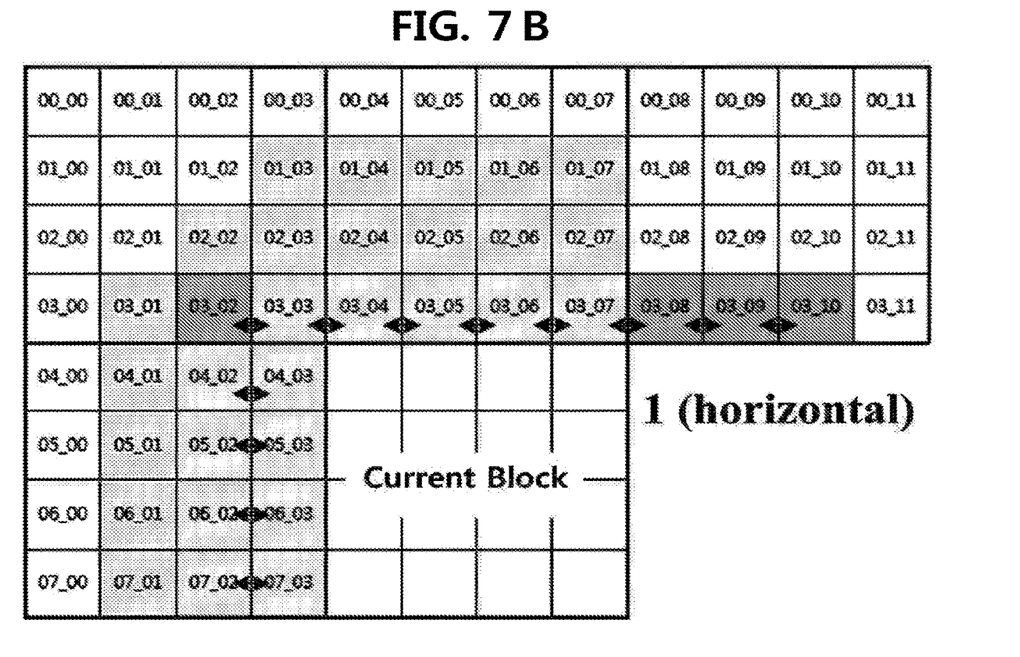
Figure 7C:
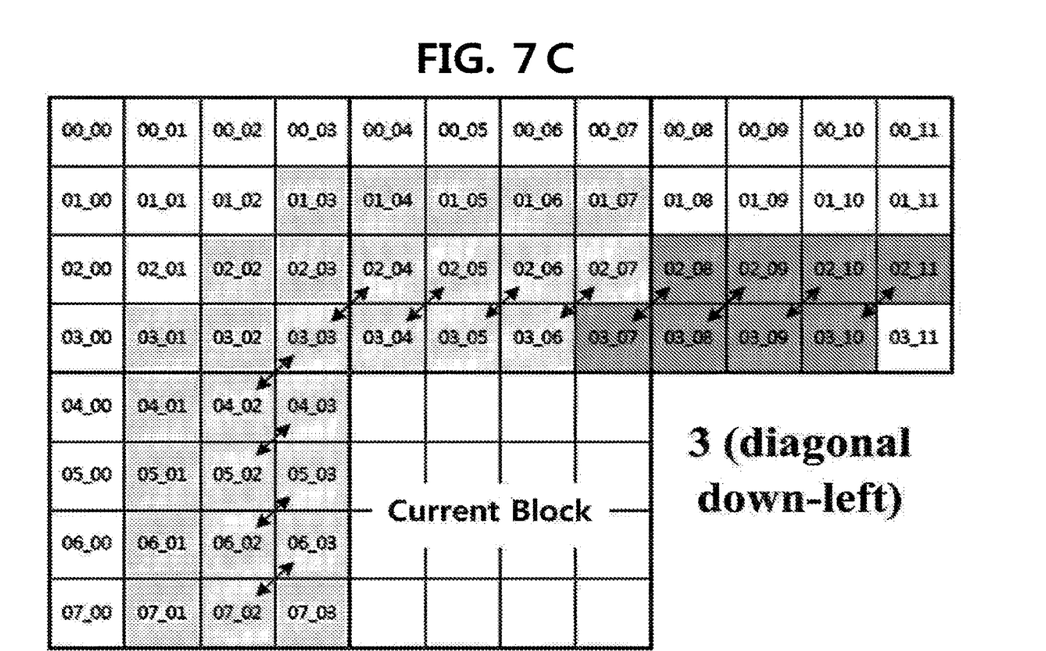
Figure 7D:
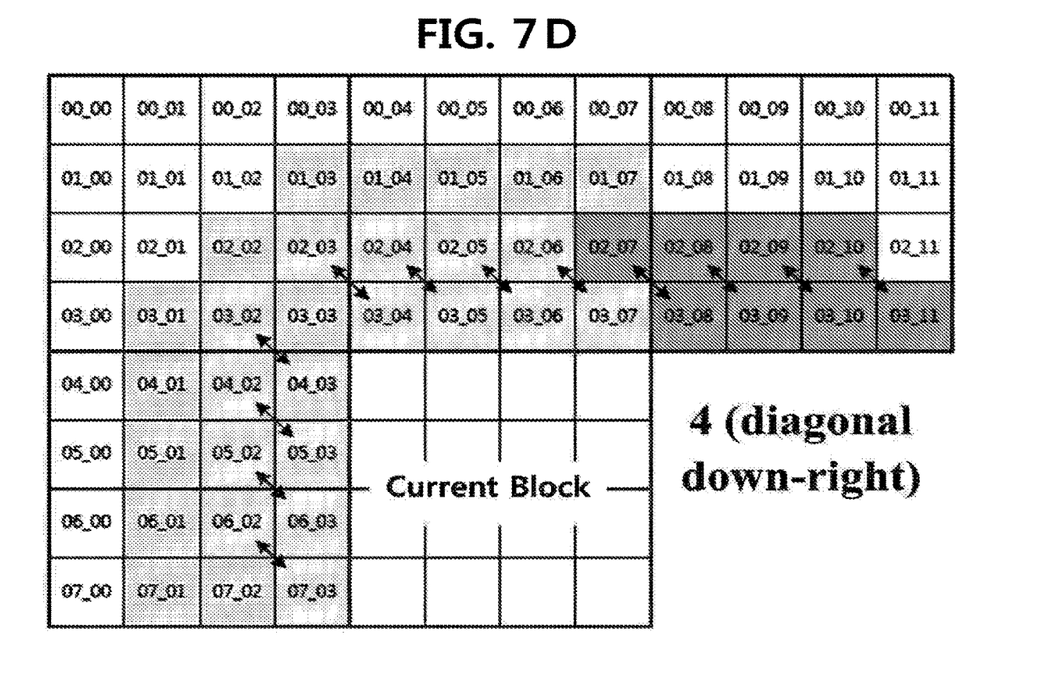
Figure 7G:
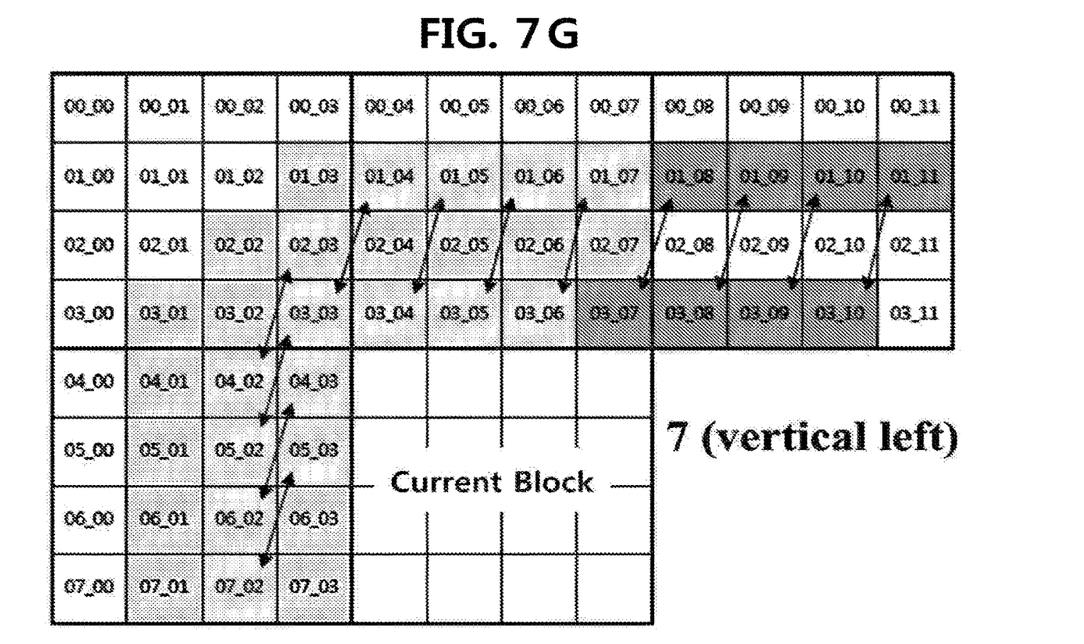
Figure 7H:
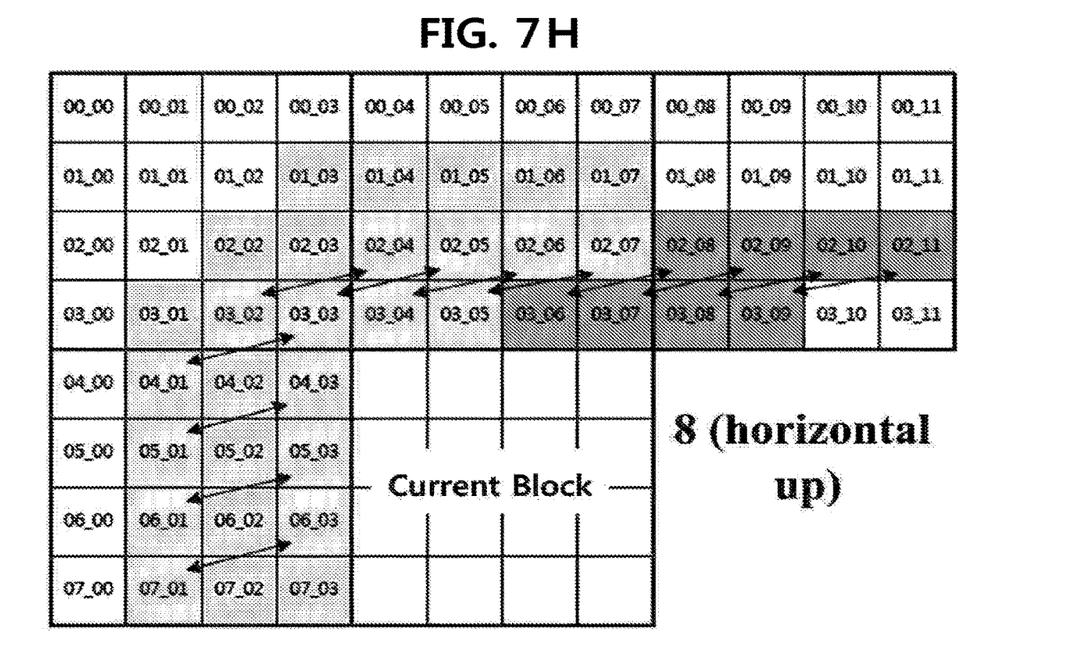

FIG. 7A shows an example of calculating a cost of a vertical direction. The cost $C_0$ of the vertical direction is obtained by selecting 12 pixel pairs in the vertical direction from among adjacent pixels of the neighboring blocks of the current block, and calculating a sum of deviations with respect to each pixel pair as in Equation 2. Of course, the pixels of one pixel pair may overlap with those of the other pixel pair. For example, in FIG. 7A, the pixel 03_03 makes a pair with the pixel 02_03 and a pair with the pixel 04_03.

In this manner, the process of calculating the cost of the specific direction is equally applied as in FIGS. 7B through 7H. However, the pixel pair is formed between the adjacent pixels in the case of FIGS. 7A through 7D, whereas the pixel pair may be formed between the pixels that are not adjacent to each other in the case of FIGS. 7E through 7H. This is because, in the case of FIGS. 7E through 7H, a slope is ±2 or ±½. Of course, a method of interpolating the adjacent pixels without using the separated pixels is possible. For example, it is shown in FIG. 7E that the pixel 03_04 makes a pair with the pixel 01_03, but the pixel 03_04 may make a pair with half pixels interpolated from the pixel 02_03 and the pixel 02_04.

Meanwhile, in regard to the eight modes having directionality among the nine intra modes, the cost $C_i$ of each directionality can be calculated by forming the pixel pair as in FIGS. 7A through 7H and substituting the formed pixel pair into Equation 1. However, since the cost $C_2$ of mode 2 of the intra modes is calculated by an average without directionality, $D_{ik}$ (i=2) of Equation 2 can be obtained from Equation 3 below.

$$D_{2k} = |\mu - p_k|$$ [Equation 3]

Here, $P_k$ is the value of the k-th pixel among the n pixels selected from the neighboring blocks, and μ is the average of the pixel values, i.e. $1/n \times \Omega P_k$. When $D_{2k}$ obtained in this way is substituted into Equation 2, the cost $C_2$ of mode 2 can be finally calculated.

Figure 8:
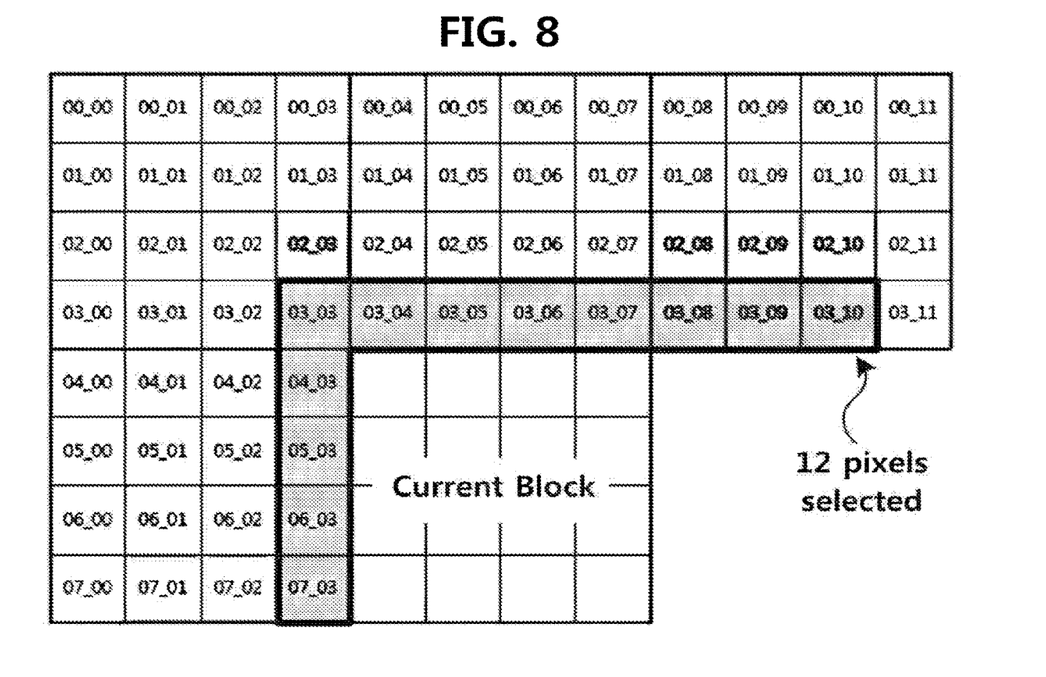
FIG. 8 shows a second detailed example embodiment of generating a prediction block of intra-prediction of the present invention.

FIG. 8 shows an example of selecting n pixels from neighboring blocks in order to calculate a cost of mode 2. Since n is set to 12 in the embodiments of FIGS. 7A through 7H, a total of 12 adjacent pixels are selected in FIG. 8 so as to correspond to the set value.

The mode selector 210 or 540 can calculate the costs $C_i$, of a total of nine intra modes as shown in the embodiments of FIGS. 7A through 7H and 8, and then select one having a minimum cost from among the intra modes. Since this selected intra mode is obtained without using information about the current block, it can be used in common for the video encoder 200 and the video decoder 500.

In example embodiments of the present invention, the directionality of the neighboring blocks is used to select the intra mode suitable for the current block. This starts on the assumption that the directionalities of the small-sized neighboring blocks such as 4×4 blocks are similar to each other. Of course, when the directionality of the neighboring block is different from that of the current block, there is a possibility of the energy of a residual increasing compared to the existing H.264. This possibility is nothing but a problem of trade-off for benefits obtained by not encoding the intra mode information. However, since the intra mode information should be encoded in units of a small size of 4×4, an amount of bits reduced by omitting the encoding is considerable. As such, if a difference between the directionalities of the neighboring block and the current block is not great, the method of example embodiments of the present invention can be regarded to be efficient. Further, if a plurality of (typically, four) neighboring blocks rather than a single neighboring block are referred to, it is possible to minimize the difference between the directionalities of the neighboring block and the current block.

Figure 9:
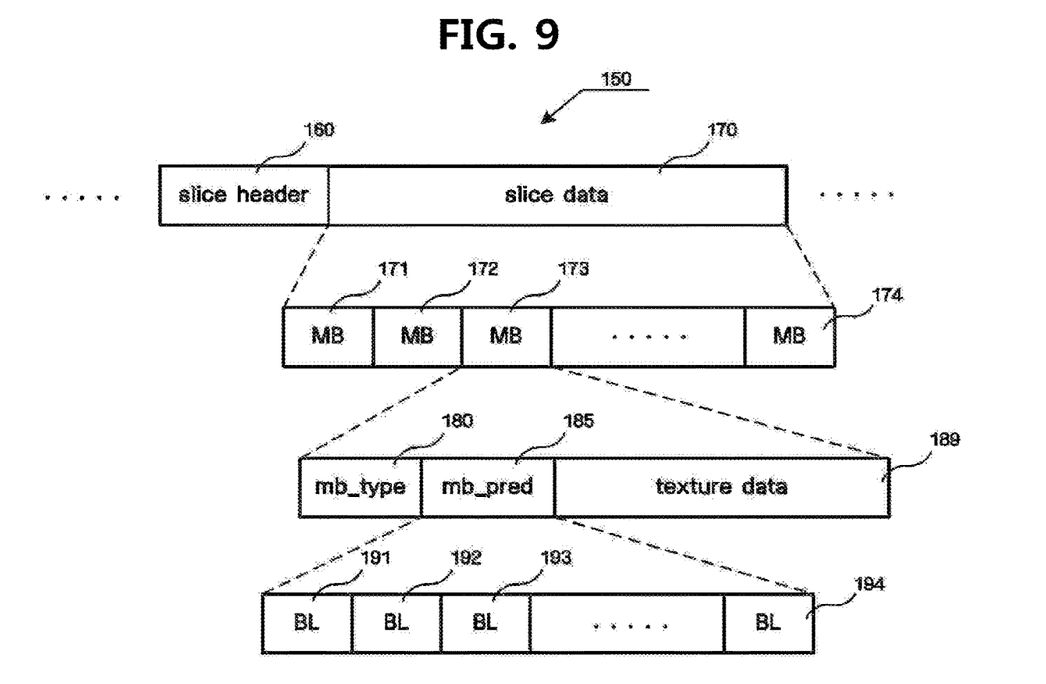
FIG. 9 shows the structure of a bitstream generated from a video encoder according to an example embodiment of the present invention.

FIG. 9 shows the structure of a bitstream 150 according to an example embodiment of the present invention. In H.264, such a bitstream is encoded in units of slices. The beat stream 150 may include a slice header 160 and slice data 170. The slice data 170 is made up of a plurality of macroblock data (MB) 171 to 174. Further, one 173 of the MBs may be made up of an mb_type field 180, an mb_pred field 185, and a texture data field 189.

Here, the mb_type field 180 is recorded with a value indicating a type of the macroblock. In other words, the value indicates whether a current macroblock is an intra macroblock or an inter macroblock.

Further, the mb_pred field 185 is recorded with a detailed prediction mode based on the macroblock type. In the case of the inter macroblock, information about a reference frame number and a motion vector is recorded according to each macroblock partition. However, in example embodiments of the present invention, in the case of the intra macroblock, the selected intra mode does not need to be recorded in this field, unlike the conventional H.264. In other words, in the case of the intra macroblock, the mb_pred field 185 can be omitted.

In the case of the conventional H.264, the mb_pred field 185 includes block information fields 191 to 194 for recording the intra mode according to each block (4×4 block). In the intra macroblock according to example embodiments of the present invention, these block information fields are omitted, so that it is possible to remarkably reduce a size of the bitstream.

Like the conventional H.264, the texture data field 189 is recorded with encoded residual signals, i.e. texture data.

According to example embodiments of the present invention, in comparison with an existing H.264 standard, since the intra mode information is not coded while using intra-prediction coding as it stands, it is greatly reduce the overhead of a bitstream transmitted from an encoder to a decoder.

Thus, when the coded bitstreams are identical in size, it is possible to provide a higher quality to an image reconstructed at the stage of a video decoder.

While the invention has been shown and described with reference to certain example embodiments thereof, it will be understood by those skilled in the art that various changes in form and details may be made therein without departing from the spirit and scope of the invention as defined by the appended claims. Therefore, it is to be understood that the embodiments described herein are illustrative in every respect and not restrictive.

What is claimed is:

1. A video decoding method performed by a video decoding apparatus, the method comprising:
   determining a neighboring intra prediction mode associated with a neighboring block, the neighboring block being adjacent to a current block;
   determining a current intra prediction mode associated with the current block based on whether the neighboring intra prediction mode associated with the neighboring block has directionality or not;
   performing intra-prediction based on the current intra prediction mode associated with the current block to generate a prediction block associated with the current block;
   obtaining transform coefficients;
   dequantizing the transform coefficients to generate dequantized transform coefficients;
   transforming the dequantized transform coefficients to generate a residual block associated with the current block; and
   reconstructing the current block based on the prediction block and the residual block,
   wherein determining the current intra prediction mode associated with the current block comprises:
   determining candidate intra prediction modes associated with the current block according to a first set of two or more mathematical expressions, when the neighboring intra prediction mode associated with the neighboring block has no directionality,
   determining candidate intra prediction modes associated with the current block according to a second set of two or more mathematical expressions, when the neighboring intra prediction mode associated with the neighboring block has directionality,
   selecting the current intra prediction mode associated with the current block among the candidate intra prediction modes,
   wherein the second set of two or more mathematical expressions is different from the first set of two or more mathematical expressions,
   wherein the second set of two or more mathematical expressions use the neighboring intra prediction mode associated with the neighboring block, and
   the neighboring block includes an upper block adjacent to the current block.

2. The video decoding method of claim 1, wherein an intra prediction mode having no directionality includes a DC mode.

3. The video decoding method of claim 1, wherein selecting the current intra prediction mode associated with the current block among the candidate intra prediction modes comprises:
   obtaining information for selecting the current intra prediction mode associated with the current block among the candidate intra prediction modes; and
   selecting the current intra prediction mode associated with the current block among the candidate intra prediction modes based on the obtained information.

4. The video decoding method of claim 1, wherein obtaining the transform coefficients comprises:
   decoding an input bitstream to obtain the transform coefficients.

5. The video decoding method of claim 4, wherein decoding the input bitstream comprises:
   losslessly decoding the input bitstream to obtain the transform coefficients.

6. The video decoding method of claim 1, wherein reconstructing the current block comprises:
   reconstructing the current block by adding the prediction block and the residual block.

7. A video encoding method performed by a video encoding apparatus, the method comprising:
   determining a current intra prediction mode associated with a current block;
   performing intra-prediction according to the current intra prediction mode associated with the current block to generate a prediction block associated with the current block;
   determining a neighboring intra prediction mode associated with a neighboring block, the neighboring block being adjacent to the current block;
   encoding the current intra prediction mode associated with the current block based on whether the neighboring intra prediction mode associated with the neighboring block has directionality or not;

obtaining a residual block associated with the current block by using the prediction block and the current block;

transforming the residual block to generate transform coefficients;

quantizing the transform coefficients to generate quantized transform coefficients;

encoding the quantized transform coefficients, wherein the encoding the current intra prediction mode associated with the current block comprises:

determining candidate intra prediction modes associated with the current block according to a first set of two or more mathematical expressions, when the neighboring intra prediction mode associated with the neighboring block has no directionality, determining candidate intra prediction modes associated with the current block according to a second set of two or more mathematical expressions, when the neighboring intra prediction mode associated with the neighboring block has directionality, encoding the current intra prediction mode associated with the current block based on the candidate intra prediction modes, wherein the second set of two or more mathematical expressions is different from the first set of two or more mathematical expressions, wherein the second set of two or more mathematical expressions use the neighboring intra prediction mode associated with the neighboring block, and the neighboring block includes an upper block adjacent to the current block.

8. The video encoding method of claim 7, wherein an intra prediction mode having no directionality includes a DC mode.

9. The video encoding method of claim 7, wherein the encoding the current intra prediction mode associated with the current block among the candidate intra prediction modes comprises:

identifying the current intra prediction mode associated with the current block among the candidate intra prediction modes; and encoding information for identifying the current intra prediction mode associated with the current block among the candidate intra prediction modes.

10. The video encoding method of claim 7, wherein encoding the quantized transform coefficients comprises:

encoding the quantized transform coefficients to generate an input bitstream.

11. The video encoding method of claim 10, wherein encoding the quantized transform coefficients comprises:

losslessly encoding the quantized transform coefficients to generate the input bitstream.

12. The video encoding method of claim 7, wherein obtaining the residual block comprises:

subtracting the prediction block from the current block to obtain the residual block associated with the current block.

13. A method of transmitting a bitstream performed by an image encoding apparatus, the method comprising:

determining a current intra prediction mode associated with a current block;

performing intra-prediction according to the current intra prediction mode associated with the current block to generate a prediction block associated with the current block;

determining a neighboring intra prediction mode associated with a neighboring block, the neighboring block being adjacent to the current block;

encoding, into the bitstream, the current intra prediction mode associated with the current block based on whether the neighboring intra prediction mode associated with the neighboring block has directionality or not;

obtaining a residual block associated with the current block by using the prediction block and the current block;

transforming the residual block to generate transform coefficients;

quantizing the transform coefficients to generate quantized transform coefficients; and encoding, into the bitstream, the quantized transform coefficients; and transmitting the bitstream to an image decoding apparatus, wherein the encoding the current intra prediction mode associated with the current block comprises:

determining candidate intra prediction modes associated with the current block according to a first set of two or more mathematical expressions, when the neighboring intra prediction mode associated with the neighboring block has no directionality, determining candidate intra prediction modes associated with the current block according to a second set of two or more mathematical expressions, when the neighboring intra prediction mode associated with the neighboring block has directionality, encoding the current intra prediction mode associated with the current block based on the candidate intra prediction modes, wherein the second set of two or more mathematical expressions is different from the first set of two or more mathematical expressions, wherein the second set of two or more mathematical expressions use the neighboring intra prediction mode associated with the neighboring block, and the neighboring block includes an upper block adjacent to the current block.

\* \* \* \* \*